(12) United States Patent
Wang et al.

(10) Patent No.: US 9,065,362 B2
(45) Date of Patent: Jun. 23, 2015

(54) DETERMINATION OF HYSTERESIS CONTROLLER BAND FOR IPMSM-BASED DRIVE SYSTEM

(71) Applicant: Ford Global Technologies, LLC, Dearborn, MI (US)

(72) Inventors: Chiang-jiang Wang, Troy, MI (US); Michael Degner, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 68 days.

(21) Appl. No.: 13/923,862

(22) Filed: Jun. 21, 2013

(65) Prior Publication Data
US 2014/0375237 A1    Dec. 25, 2014

(51) Int. Cl.
*H02P 6/12* (2006.01)
*H02P 7/00* (2006.01)

(52) U.S. Cl.
CPC ........................................ *H02P 7/00* (2013.01)

(58) Field of Classification Search
CPC ............................................................ H02P 6/06
USPC ................................. 318/400.15, 400.01, 700
See application file for complete search history.

(56) References Cited

U.S. PATENT DOCUMENTS

| 5,361,021 | A  | * | 11/1994 | Meyer et al. ............. 318/400.25 |
| 5,625,264 | A  | * | 4/1997 | Yoon ........................ 318/400.06 |
| 6,094,364 | A  |   | 7/2000 | Heikkila |
| 7,245,103 | B2 | * | 7/2007 | Chapman et al. ............. 318/651 |
| 7,336,050 | B2 |   | 2/2008 | Ihm |
| 7,847,501 | B2 |   | 12/2010 | Baglino |
| 2010/0231148 | A1 |   | 9/2010 | Tobari |

FOREIGN PATENT DOCUMENTS

CN          10157751 A     11/2009

OTHER PUBLICATIONS

Ronanki, Parthiban, and Gogineni, "Simulation of Direct Torque Control of IPMSM for HEV Application Using Matlab/Simulink", http://psrcentre.org/images/extraimages/1211356.pdf.
Gulez, Adam, and Pastaci, "Improving the Performance of Hysteresis Direct Torque Control of IPMSM Using Active Filter Topology", http://www.ias.ac.in/sadhana/pdf2006Jun/245.pdf.
Yaohua, Qiang, Jiangyu, "A Novel Direct Torque Control Permanent Mgnet Synchronous Motor Drive Used in Electrical Vehicle", http://www.google.com/url?sa=t&rct=j&q=control%20for%20%20hysteresis%20band%20%28ipmsm%20%20or%20interier%20permanent%20magnetic%20synchronous%20motor%29%20in%20vehicle&source=web&cd=1&ved=0CDkQFjAA&url=http%3A%2Fiaesjournal.com%2Fonline%2Findex.php%2FIJPEDS%2Farticle%2Fdownload%2F141%2Fpdf&ei=7W3IT8ztA4jRrQf7wP22Dg&usg=AFQjCNHI4iZ7HJKWSHXiGzUoz0bMRFt6dw&cad=rja.

* cited by examiner

*Primary Examiner* — David S Luo
(74) *Attorney, Agent, or Firm* — Maristyn Law LLC; Lynda F. Kouroupis; David B. Kelley

(57) ABSTRACT

Methods of providing a control band for a hysteresis controller are presented. A method can determine a control band analytically to avoid the time and costs associated with manual calibration of a hysteresis controller. By way of example, a method can include modeling a machine output, such as stator flux or machine torque, modeling the variation rate for the machine output, and providing a control band based on the variation rate modeling.

28 Claims, 11 Drawing Sheets

DETERMINATION OF HYSTERESIS CONTROLLER BAND FOR IPMSM-BASED DRIVE SYSTEM

FIELD OF INVENTION

This invention relates generally to direct torque control (DTC) for an electric machine (IPMSM), and more particularly to a method for determining a DTC hysteresis controller band.

BACKGROUND

The demand for electric and hybrid electric vehicles continues to grow as governmental agencies, private organizations and individual consumers strive to conserve resources, reduce energy costs and lower carbon emissions. Electrified vehicles have an electric drive system that includes an electrical machine to assist or replace the internal combustion engine of a conventional vehicle, a power conversion system configured to provide energy to the electric machine, and a machine controller configured to control machine operation. Due to its high power/torque density, its high efficiency, and its high reliability, a permanent magnet synchronous motor (PMSM) is a popular choice for electric vehicle drive systems. Most machine controllers used with PMSMs in electric vehicle applications implement field-oriented control (FOC) techniques due to the high dynamic response and performance they can provide. However, FOC systems can be rather complex, requiring continuous rotor position information, current regulators, transformations between rotating and stationary coordinate systems, and pulse width modulation (PWM) generators. In addition, FOC systems can be sensitive to parameter fluctuations, external disturbances and load changes.

Recently, increased consideration is being given to the use of interior PMSM (IPMSM) machines in electric vehicle applications. IPMSMs are already widely used in high-performance drives ranging from servos to traction applications. The development of highly coercive permanent magnet materials like neodymium iron boron (NdFeB) at lower costs makes IPMSMs, with their increased energy density, an attractive option for electric propulsion systems. In addition, IPMSMs provide good dynamic performance with a high torque/inertia ratio, are highly efficient, and are also highly reliable. Unlike the inductance characteristics of a typical PMSM, the IPMSM q-axis inductance can be much larger than the d-axis inductance. This disparity increases the efficacy of flux weakening operations at IPMSMs, and enables them to provide an extended constant power range capability over that of PMSMs. Such capability is advantageous in electric vehicle applications, as studies have shown that it can allow the use of power inverters with lower volt-ampere ratings, and abrogate the need for multiple gear ratios.

DTC, originally introduced for induction motor control, offers direct, independent control of the stator flux linkage and the electromagnetic torque of an electric machine. Because the electromagnetic torque of an IPMSM is proportional to the angle between the stator and rotor flux linkages, DTC, with its good dynamic response, is an attractive option for IPMSM propulsion systems in electric vehicles. In general, DTC is designed to control torque and flux linkage by applying a voltage vector to an inverter configured to provide alternating current to the electric machine. The particular voltage vector applied is dependent on the outputs of a torque hysteresis controller and a flux hysteresis controller. A DTC system can include a voltage table that associates various combinations of hysteresis controller outputs with a voltage vector that is expected to result in the fastest electromagnetic torque response. Two significant control parameters for this table-based DTC solution are the torque and flux hysteresis controller bands which need to be calibrated or tuned to provide a desired level of performance. While small bands may be desired for higher machine output accuracy, they are generally not achievable given the physical limitations of drive system components. On the other hand, large bands, more easily achievable, are prone to noise, vibration and harshness problems which can adversely impact performance and disappoint and/or frustrate an operator. Unfortunately, there is no universal or standard method for specifying hysteresis controller bands for a particular application. Instead, determination of controller bands is essentially a trial and error process which can be costly and inefficient.

SUMMARY OF THE INVENTION

A method for determining a controller band for a DTC hysteresis controller is presented. An example method can include modeling a machine output, modeling the machine output variation rate, and providing a band for the hysteresis controller based on the modeled variation rate. An exemplary method can include using an electric drive system (EDS) characteristic to determine a hysteresis controller band. A method of the invention can be practiced to determine the band for a hysteresis flux controller and/or a hysteresis torque controller for an electric vehicle electric drive system (EDS).

By way of example, a method for determining a flux controller band can include modeling the flux of an IPMSM, modeling the flux variation rate, determining the average flux variation rate, and using the average flux variation rate to define a flux controller band. In an example embodiment, EDS characteristics such as a DC bus voltage and inverter switching rate can be used to provide a controller band that can range from $-B_L$ to $+B_L$ about a midpoint $B_{CL}$, where $B_L$ represents a band limit. A method of the invention can comprise dividing an inverter DC bus voltage by the product $(4\pi * f_{inv\_max})$, where $f_{inv\_max}$ represents a maximum switching frequency of the inverter, to provide a limit $B_F$ for defining a stator flux controller band. In an example embodiment, a method of the invention can comprise dividing an inverter DC bus voltage by the product $(\sqrt{3}L_q I_{sm} f_{inv\_max})$, to provide a limit $B_T$ for a torque controller band, where $L_q$ is a q-axis inductance for said machine, $I_{sm}$ is a maximum stator current for said machine, $\tau_m$ is a maximum torque for said machine, and $f_{inv\_max}$ is a maximum switching frequency of an inverter. By way of example, a band for a flux hysteresis controller can have a width $2B_F$, with a center or midpoint $B_{CF}$. Similarly, a band for a torque controller can have a width $2 B_T$, with a center or midpoint $B_{CT}$.

An example method can include receiving a stator flux error at a hysteresis controller, changing controller output when the received stator flux error is greater than the most recent previous received stator flux and is greater than or equal to an upper controller band limit, changing controller output when the received stator flux error is less than the most recently received stator flux error and is equal to or less than a lower controller band limit, and performing no change to controller output when the received stator flux is between the upper and lower limits, wherein the upper limit $$B_F = \frac{V_{dc}}{4\pi \cdot f_{inv\_max}},$$

$V_{dc}$ represents the inverter DC bus voltage, and $f_{inv\_max}$ represents the maximum switching frequency of the inverter.

An exemplary method of the invention can include modeling the torque of a DTC controlled EDS system, modeling the torque variation rate, and using the modeled torque variation rate to define a torque controller band. In an example embodiment IPMSM characteristics, such as d-axis and q-axis inductances and operational conditions can be used to determine a torque controller band. In an exemplary embodiment, band determination for a hysteresis torque controller can be performed using a machine's largest torque and its lowest speed.

A system of the invention can include a processor configured to cooperate with a hysteresis controller band unit (HCBU) to determine a band for a DTC hysteresis controller. In an example embodiment, an HCBU can comprise hardware, software, firmware or some combination thereof, and can include a machine output modeling module (MOMM), an output variation modeling module (OVMM), and a controller band determination module (CBDM).

A system of the invention can comprise a processor and a non-transitory computer readable medium having encoded thereon instructions for the processor that when executed by the processor cause the processor to provide a hysteresis controller band. In an example embodiment, the instructions can cause the processor to use machine output variation rate modeling and EDS characteristics to provide an upper and lower limit for a controller band.

A system of the invention can include an inverter, an IPMSM and a machine controller configured to control IPMSM operation, wherein the machine controller includes a hysteresis controller having a band based on a machine output variation rate. By way of example, a system can include a hysteresis controller having a band defined by a limit $$B_L = \frac{V_{dc}}{4\pi \cdot f_{inv\_max}}$$

where $V_{dc}$ represents the inverter DC bus voltage, and $f_{inv\_max}$ represents the maximum switching frequency of the inverter. In an example embodiment, a system can include a hysteresis controller having a band defined by a limit $$B_L = \frac{V_{dc}}{\sqrt{3} L_q I_{sm} f_{inv\_max}} \cdot \tau_m$$

where $I_{sm}$ is the maximum stator current, $L_q$ is the q-axis inductance, and $\tau_m$ is the maximum torque.

In an exemplary embodiment, a machine controller can comprise an error detection unit, a hysteresis control unit, a voltage vector unit, and an observation/estimation unit, wherein the hysteresis control unit includes a hysteresis controller having a band based on a machine output variation rate. By way of example, a hysteresis flux controller can have a band defined by a limit $$B_F = \frac{V_{dc}}{4\pi \cdot f_{inv\_max}}.$$

By way of example, a hysteresis torque controller can have a band defined by a limit $$B_T = \frac{V_{dc}}{\sqrt{3} L_q I_{sm} f_{inv\_max}} \cdot \tau_m.$$

DETAILED DESCRIPTION OF EXEMPLARY EMBODIMENTS

As required, detailed embodiments of the present invention are disclosed herein. However, it is to be understood that the particular embodiments discussed are merely descriptive examples of the invention, which can be practiced in various and alternative embodiments. The figures are not necessarily to scale, and some features may be exaggerated, minimized or omitted to emphasize details of particular components. Therefore, specific structural and functional details described herein are not to be interpreted as limiting, but merely as a representative basis for teaching one skilled in the art to variously employ the invention. The invention comprehends various aspects of hysteresis band modeling and its various applications.

Systems and methods of the invention can be practiced to determine and implement a controller band for a hysteresis controller in a direct torque control (DTC) electric machine system. The invention can be used in the design and implementation of electric drive systems, particularly in aspects of torque and flux control in DTC systems. Although discussed below in the context of electrified vehicles, it is contemplated that the invention can also be used for non-vehicular applications.

Figure 1:
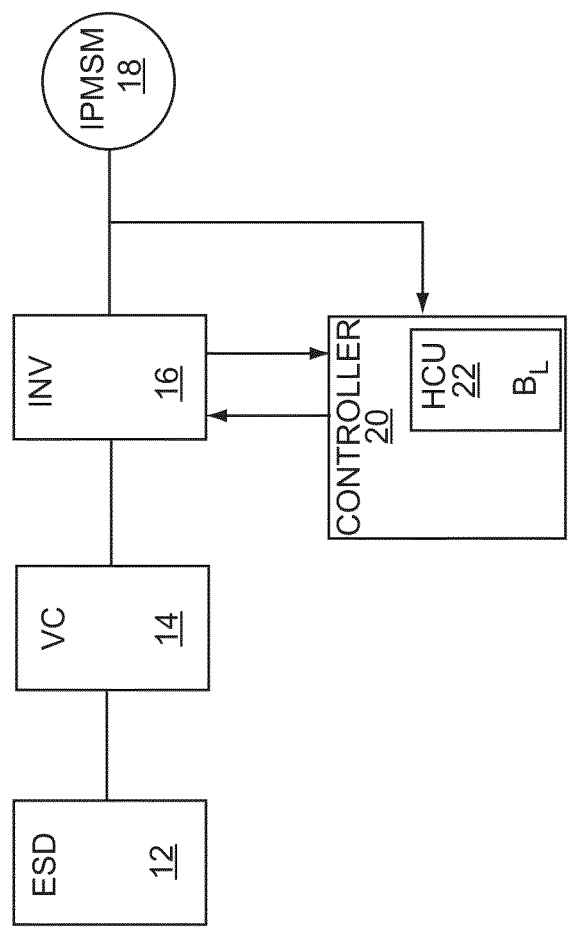
FIG. 1 shows an example electric drive system of the invention.

Turning now to the several drawings in which like reference numerals refer to like elements throughout the several views, FIG. 1 shows an example electric drive system (EDS) 10 for an electrified vehicle that includes an energy storage device (ESD) 12, a voltage converter 14, an inverter 16, an interior permanent magnet synchronous machine (IPMSM) 18 and a machine controller 20. By way of example, the ESD 12 can be in the form of a high voltage traction battery, and the voltage converter 14 can be a boost-buck converter configured to receive a DC voltage from the ESD 12, and boost it to a higher DC bus voltage for the inverter 16. The inverter 16 can be configured to receive drive signals from the controller 20 that cause it to convert a DC voltage from the voltage converter 14 to a three phase alternating current that can be provided to the IMPSM 18. The controller 20 is configured to implement direct torque control (DTC) methods to provide drive signals for the inverter 16 that cause it to produce phase currents that result in the IPMSM 18 production of a desired torque and flux.

By way of example, drive signals can be in the form of inverter gate control signals that can control the operation and duty cycles of the inverter 16 power electronic devices. As shown in FIG. 1, the controller 20 can be configured to receive current feedback information and inverter parameter information that can be used to provide the inverter control signals. The controller 20 can include a hysteresis control unit (HCU) 22 configured to control IPMSM 18 electromagnetic torque and stator flux. In an example embodiment, the HCU 22 has at least one hysteresis controller having a band defined by a limit $B_L$ determined by a method of the invention. By way of example, $B_L$ can be based on a machine output fluctuation rate.

Figure 2:
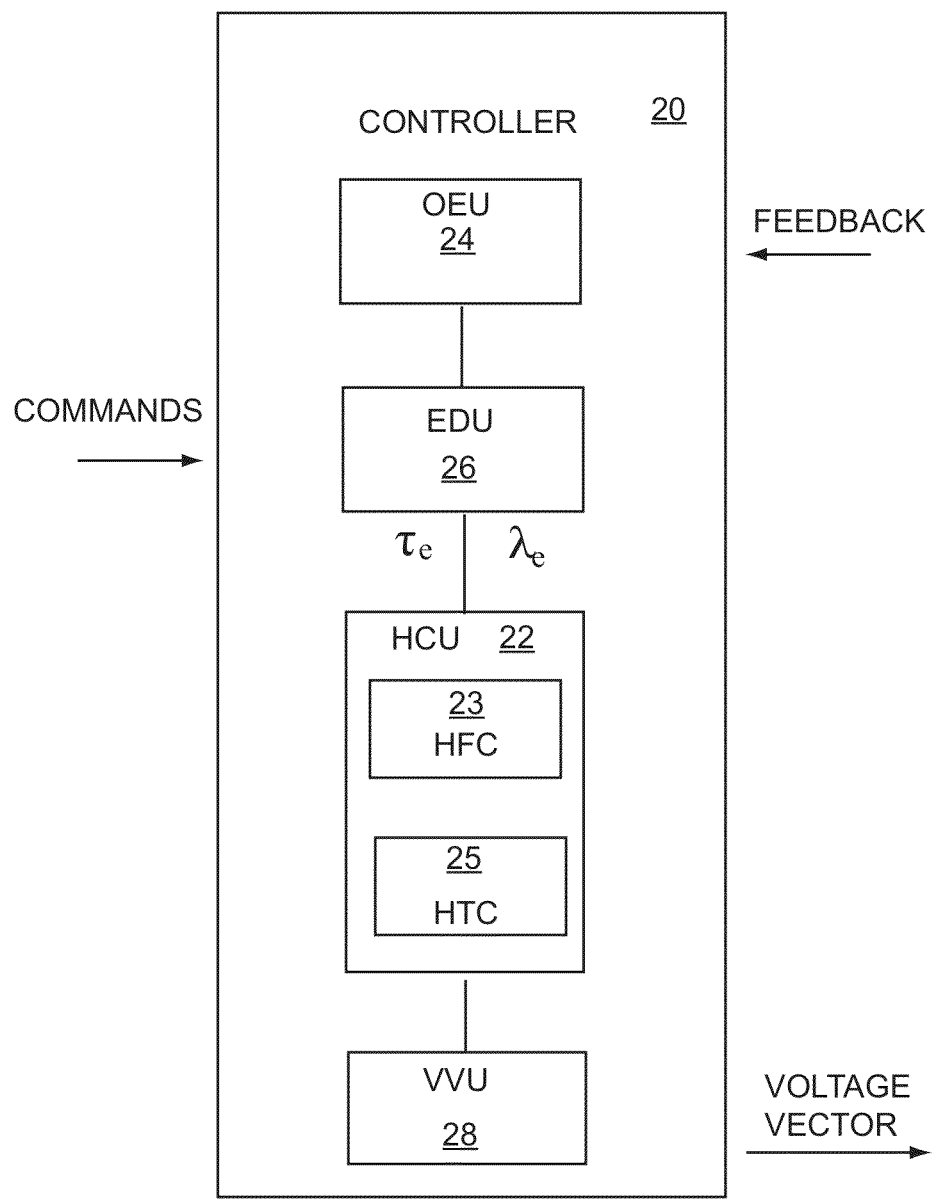
FIG. 2 shows an example controller.

FIG. 2 shows an example embodiment of the controller 20 in which it includes an observation/estimation unit (OEU) 24, an error determination unit (EDU) 26, the HCU 22, and a voltage vector unit (VVU) 28. In an example embodiment, the OEU 24 can be configured to use current and voltage information to determine a machine output such as stator flux or electromagnetic torque. By way of example, the OEU 24 can be configured to use inverter gate control signals and dc bus voltage $V_{DC}$ to synthesize voltage information for its determinations. In an example embodiment, the OEU 24 can be configured to receive current information from current sensors configured to detect IPMSM 18 stator currents. In an example embodiment, the OEU 24 can use observed stator flux and sensed stator currents to provide a machine torque estimate.

The EDU 26 can be configured to receive torque and flux commands, for example from a vehicle electronic control unit (not shown), and can further be configured to receive a torque estimate and an observed flux from the OEU 24. The EDU 26 can be configured to determine the difference between a command value and observed/estimated value for a machine output. For example, the EDU 26 can be configured to determine the difference between command and estimated torque to provide a torque error $\tau_e$, and can be configured to determine the difference between a command flux and an observed flux to determine a flux error $\lambda_e$. In an example embodiment, the flux error $\lambda_e$ can be used to adjust the amplitude of the IPMSM 18 stator flux, and the torque error $\tau_e$ can be used to adjust the phase angle of the stator flux. As shown in FIG. 2, the torque error $\tau_e$ and the flux error $\lambda_e$, can be provided to the hysteresis control unit 20.

By way of example, the HCU 22 can include a hysteresis flux controller (HFC) 23 configured to provide flux control, and a hysteresis torque controller (HTC) 25 configured to provide torque control. A basic principle of DTC is independent control of the IPMSM 18 stator flux and torque exercised through two independent hysteresis controllers, each characterized by an independent hysteresis control band. The width of the hysteresis band defines the variation in machine output that can be tolerated without a change in controller output. Essentially, the hysteresis control band controls the switching of an inverter that produces a change in machine output. Accordingly, the narrower the band, the less variation in output that will be tolerated, and the higher the inverter switching rate will be. Likewise, the wider the control band, the greater the allowable range of values for a machine output that will be tolerated prior to applying a new voltage vector, and the lower the inverter switching rate will be.

An IPMSM of a DTC-controlled system can receive energy from a three-phase inverter, with the status of six inverter power switches determining an IPMSM stator voltage. Machine output can be maintained within the hysteresis controller band by application of an appropriate voltage vector to an inverter. In an example embodiment, the voltage vector unit VVU 28 can be configured to use the outputs from both the HFC 23 and the HTC 24 to provide a voltage vector to the inverter 16 that can control the status of the inverter power switches. By way of example, the VVU 28 can include a voltage table that comprises an array of predetermined vectors associated with various HCU 22 outputs. By way of example, the VVU 28 can include a memory in which a voltage table can be stored.

Figure 3A:
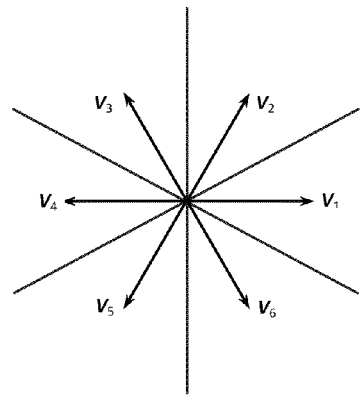
FIG. 3A shows example voltage vectors.
Figure 3B:
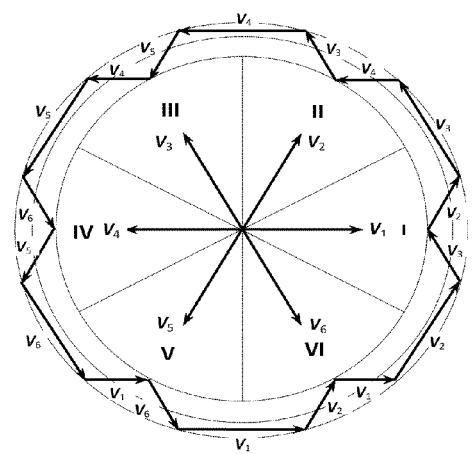
FIG. 3B shows example imposition of voltage vectors.
Figure 3C:
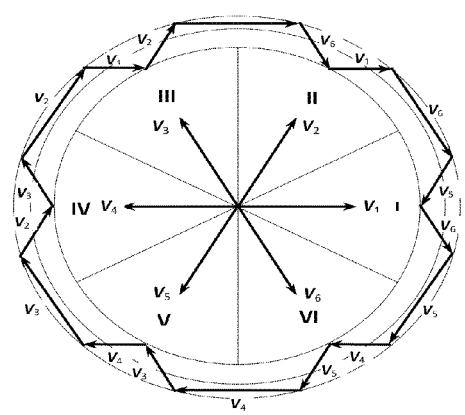
FIG. 3C shows example imposition of voltage vectors.
Figure 4A:
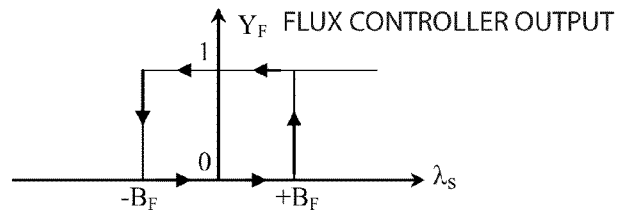
FIG. 4A shows example hysteresis flux controller output.
Figure 4B:
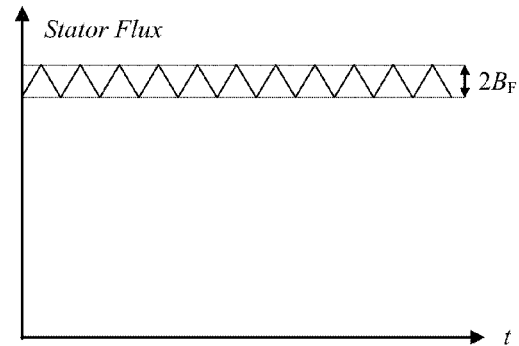
FIG. 4B shows corresponding stator flux output.
Figure 4C:
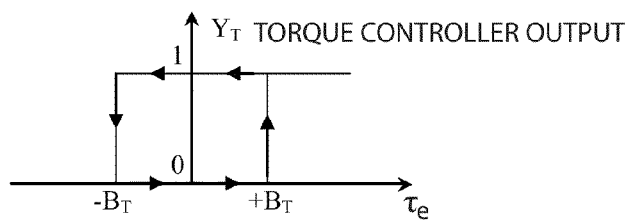
FIG. 4C shows example hysteresis torque controller output.
Figure 4D:
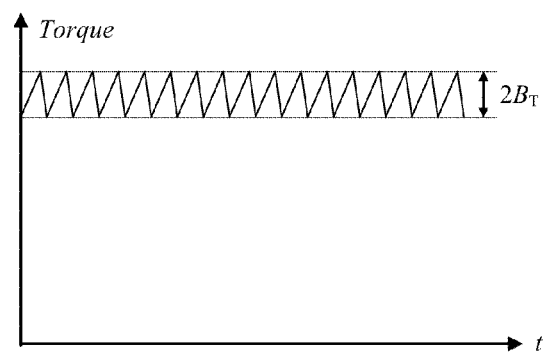
FIG. 4D shows corresponding torque output.

In an example system, six active voltage vectors V1-V6, and two zero voltage vectors V0 and V7 can be used to control an output. The active voltage vectors V1-V6 can be defined 60° apart from each other in a voltage plane as shown in FIG. 3A. A constant voltage vector can be applied to an inverter between inverter switching intervals. When an active voltage vector is applied, the tip of a stator flux vector will move in the direction of the applied voltage vector. A voltage vector plane can be divided into six regions, I-VI, as shown in FIGS. 3B and 3C. In each region, two adjacent voltage vectors that give the minimum switching frequency can be selected to either increase or decrease the amplitude of the stator flux. FIG. 3B shows how the active voltage vectors can be selected to keep machine output within a hysteresis band when an IPMSM is rotating in a counter-clockwise direction. FIG. 3C is similar, showing voltage vector selection when an IPMSM is rotating in a clock-wise direction. Thus, voltage vector selection can depend on both a hysteresis controller output and a voltage operating region. During steady state conditions, the stator flux and electromagnetic torque can be controlled to remain within the stator flux controller and torque controller hysteresis bands defined by limits $B_F$ and $B_T$ respectively as shown in FIGS. 4A-4D.

In an exemplary embodiment, a controller band for a DTC hysteresis controller can be determined by using analytical expressions and estimates for a machine output and the output variation rate. An analytical method offers several advantages over prior art methods in which hysteresis bands were calibrated or tuned, including, but not limited to, reduced costs as the need for individualized, time-consuming trials and calibrations is obviated, improved performance, optimum sizing, and ease in testing performance for a variety of operating states and conditions.

Figure 5:
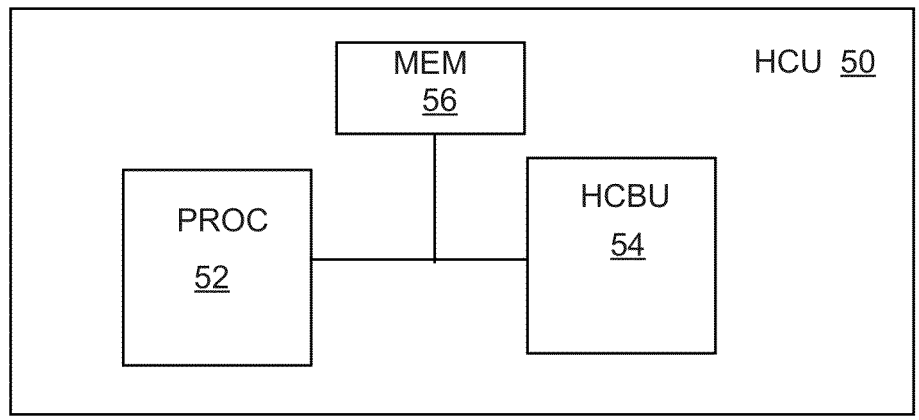
FIG. 5 shows an example system for determining a controller band.

FIG. 5 depicts an example HCU 50 for implementing a method of the invention. The HCU 50 can include a processor 52 configured to cooperate with a hysteresis control band unit (HCBU) 54 to determine a band for a DTC hysteresis controller, and can further include a memory 56. In an example embodiment, the processor 52 can be configured to receive one or more EDS parameters, such as an inverter 16 parameter, a DC bus voltage, an IPMSM characteristic, an IPMSM operational state parameter, etc. The processor 52 can be in the form of a computer, a micro-computer, a multi-purpose microprocessor, a dedicated micro-processor or any apparatus configured to read and execute encoded logic and perform the processing functions and computing functionality required to implement the methods of the invention. In an example embodiment, the processor 52 can be configured to provide a user interface for receiving user input and providing output. By way of example, the processor 52 can be coupled to a user input device and display device (not shown) configured to enable interaction with a user.

The HCBU 54 can comprise hardware, software, firmware or some combination thereof, and can be configured to cooperate with the processor 52. In an example embodiment, the HCBU 54 can comprise a non-transitory medium in which logic instructions executable by the processor 52 are stored. The instructions can cause the processor to provide a controller band for a hysteresis controller, such as a flux controller or a torque controller. By way of example, the instructions can cause the modeling of a machine output such as, but not limited to, stator flux or electromagnetic torque, the modeling of machine output variation, and the determination of a controller band based on machine output variation rate. It is contemplated that the HCBU 54 can reside at, and be integrated with, the processor 52, for example as recorded in a read-only memory of a computer. Alternatively, the HCBU 54 can be in the form of a removable storage medium on which logic is recorded. The memory 56 can comprise read-only memory as well as random access memory and may be configured to store machine and EDS parameters, characteristics, etc. as well as modeling algorithms.

Figure 6:
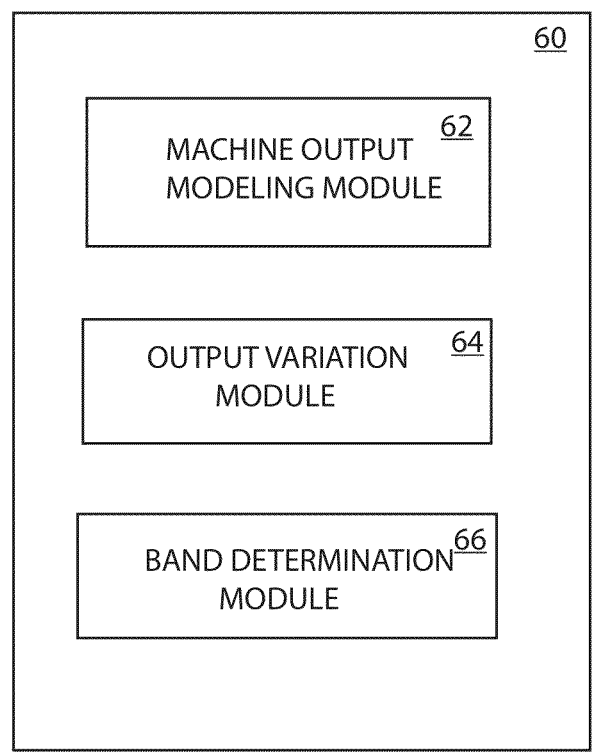
FIG. 6 shows an example hysteresis control band unit for determining a controller band.

FIG. 6 shows an example HCBU 60 that includes a machine output modeling module (MOMM) 62, an output variation module (OVM) 64, and a controller band determination module (BDM) 66. The MOMM 62 can be configured to model a machine output, such as flux or torque, using one or more analytical expressions configured to characterize the output in an IPMSM system, such as electromagnetic torque in an IPMSM-based EDS of an electrified vehicle. The OVM 64 can be configured to model the variation rate of a machine output. The OVM 64 modeling can include the use of specific EDS parameters and operational characteristics. The BDM 66 can be configured to provide a band for a hysteresis controller. By way of example, the BDM 66 can be configured to determine a controller band based on machine output variation rate modeling.

Figure 7:
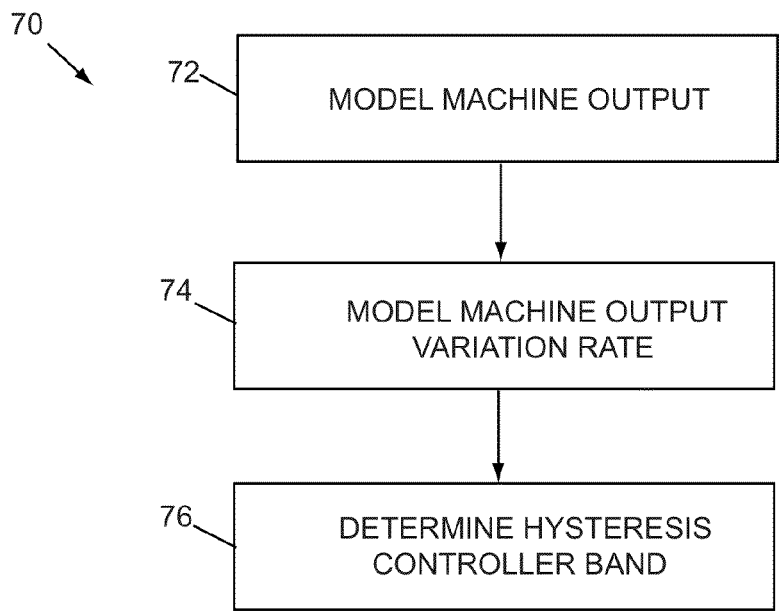
FIG. 7 shows an example method for determining a hysteresis controller band.

FIG. 7 shows an example method 70 for determining a hysteresis controller band. At block 72 a machine output can be modeled. By way of example, stator flux or electromagnetic torque can be modeled. At block 74 the machine output variation rate can be modeled, and at block 76 a band for a hysteresis controller can be determined. Apparatus and methods of the invention can be variously employed. For example, the HCBU 60 can be configured to determine a band for a hysteresis flux controller, or for a hysteresis torque controller, or for both. Similarly, the method 70 can be practiced to determine a flux controller band or a torque controller band. To simplify the present disclosure, the determination of a hysteresis flux control band will be discussed separately from the determination of a hysteresis torque control band, with the flux control band addressed first.

Figure 8:
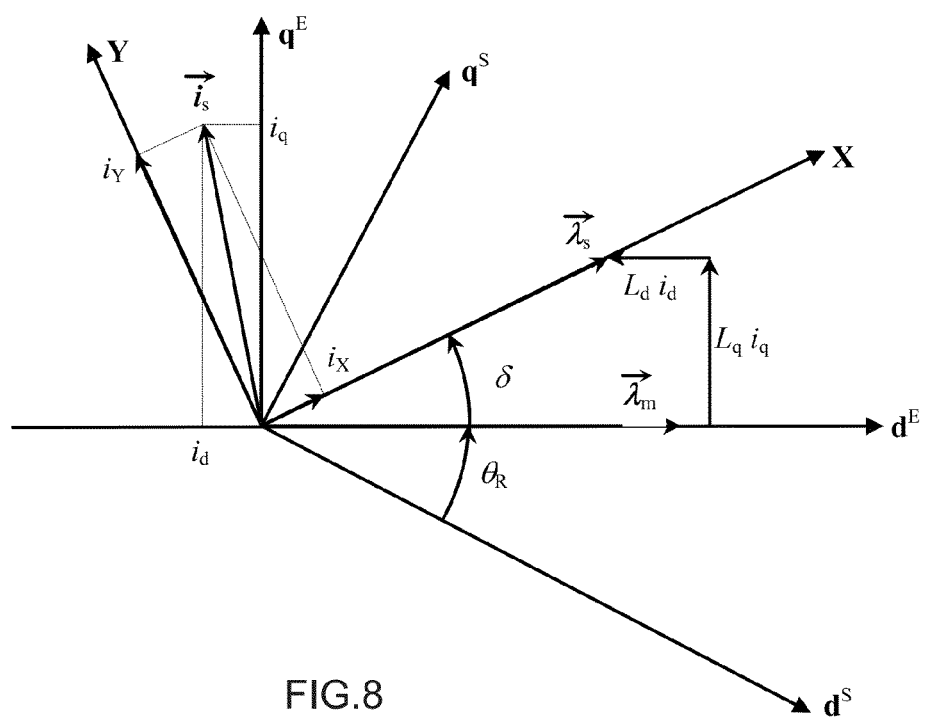
FIG. 8 shows stator current and stator flux vectors.

In an example embodiment, stator flux in a voltage-table based DTC IPMSM system can be modeled at block 72 by the MOMM 62. In a DTC system, torque and stator flux derived from measured voltages and motor terminal currents can be used to control both the amplitude and the angular position of a stator flux vector. The stator flux linkage vector $\vec{\lambda}_s$ and the rotor flux linkage vector $\vec{\lambda}_m$ can be drawn in the rotor flux, stator flux, and stationary reference frames as shown in FIG. 8 where $\vec{i}_s$ represents that stator current vector. Referring to FIG. 8, $i_q$ and $i_d$ are the q-axis and d-axis components of the stator current vector in the rotor flux reference frame, and $i_Y$ and $i_X$ are the Y-axis and X-axis components of the stator current vector in the stator flux reference frame. The angle between the stator and rotor flux linkage vectors is the torque angle δ. During steady state conditions, the average torque angle is constant, and both stator and rotor flux linkage vectors rotate at the synchronous speed. However, during transient operation, the torque angle can vary, and the stator and rotor flux linkage vectors can rotate at different speeds. At low speeds, the electrical time constant is normally smaller than the mechanical time constant, and the rotating speed of stator flux with respect to the rotor flux can change quickly.

The stator flux linkage can be expressed by (1) below:

$$\lambda_S = \sqrt{\lambda_q^2 + \lambda_d^2}, \delta = \tan^{-1}\left(\frac{\lambda_q}{\lambda_d}\right) \quad (1)$$

$$\lambda_q = L_q i_q; \lambda_d = \lambda_m + L_d i_d$$

where $\lambda_m$ is the rotor flux linkage and
$L_q$=q-axis inductance
$L_d$=d-axis inductance
$i_q$=q-axis current
$i_d$=d-axis current In an example embodiment, the MOMM 62 can be configured to use (1) to model stator flux at block 72 of method 70.

Because the stator flux and torque are independently controlled by separate hysteresis controllers, the inverter switching rate depends on both the flux controller switching rate and the torque controller switching rate, and can be expressed by $$f_{inverter} = f_{stator\_flux} + f_{torque} \quad (2)$$

Figure 9:
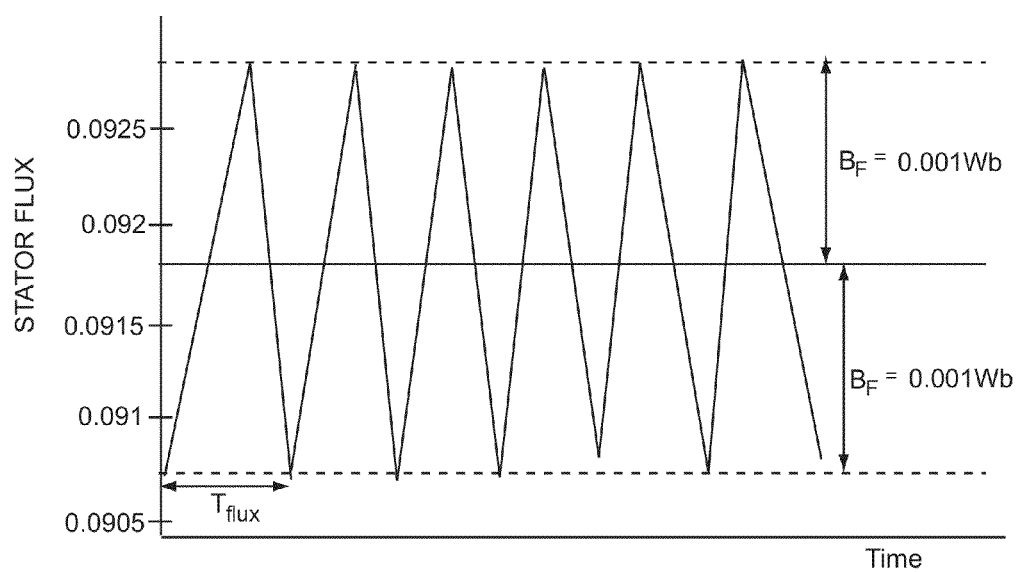
FIG. 9 shows stator flux output corresponding to a flux controller having a band limit $B_F$=0.001 Wb.

FIG. 9 shows flux controller switching frequency when a constant control band for a stator flux controller is set to have a band limit of 0.001 Wb. The switching rate for a stator flux controller can vary under a constant control band, and can depend on the operational conditions at an IPMSM. Since hysteresis controllers switch to keep a machine output, e.g. torque or stator flux, within a predetermined band, the switching rate of a hysteresis controller can be determined by modeling the variation rate of the machine output.

At block 74 of method 70, stator flux variation rate can be modeled, for example the OVM 64 can be configured to model stator flux variation rate in a table-based DTC system. Table 1 below shows possible voltage vector options as a function of stator flux vector region and hysteresis controller output.

TABLE 1

| Flux Hysteresis Output (YF) | Torque Hysteresis Output (YT) | Stator Flux Sector | | | | | |
|---|---|---|---|---|---|---|---|
| | | I | II | III | IV | V | VI |
| 1 | 1 | V2 | V3 | V4 | V5 | V6 | V1 |
| 1 | 0 | V6 | V1 | V2 | V3 | V4 | V5 |
| 0 | 1 | V3 | V4 | V5 | V6 | V1 | V2 |
| 0 | 0 | V5 | V6 | V1 | V2 | V3 | V4 |

Figure 10:
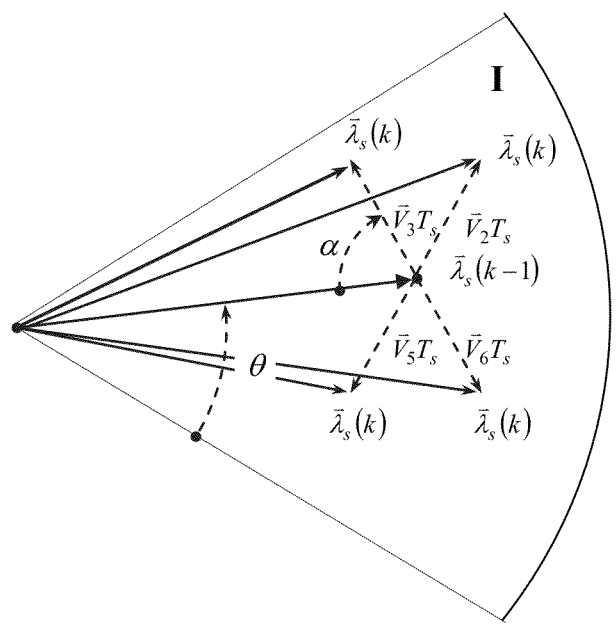
FIG. 10 shows possible flux vector variation in region I of a voltage plane.

Based on the information presented in Table 1, FIG. 10 shows how the stator flux can vary in region I of the voltage plane, with θ and α representing the position of the stator flux vector, and the angle between the stator flux vector and the applied voltage vector, respectively. As can be seen from the drawing, the stator flux vector will be moved to a new position in response to the application of a voltage vector for a control period. Considering the possible stator flux vector movement shown in FIG. 10, the variation rate for the stator flux can be modeled by:

$$\frac{\Delta \lambda_s}{T_s} = \frac{2}{3} V_{dc} \cdot \left(\frac{\lambda_0}{\lambda_s} - \cos\alpha\right) \quad (3)$$

where $\lambda_0 = \frac{1}{3} V_{dc} \cdot T_s$;

$T_s$ is a control period, and $$\alpha = \frac{\pi}{2} + \theta, \frac{\pi}{6} + \theta, \frac{\pi}{2} - \theta, \frac{5\pi}{6} - \theta$$

for $\nabla_2, \nabla_3, \nabla_5, \nabla_6$

From (3) it can be observed that the stator flux variation rate is related to the bus voltage $V_{dc}$ and the stator flux itself. Referring back to block 74 of FIG. 7, the OVM 64 can be configured to use (3) to model the flux variation rate. Determining a flux variation rate can further include determining an average flux variation rate. Eqn (3) represents flux variation within region I of a voltage plane. By integrating the flux variation rate over all six regions of a voltage plane, the following expression for the average flux variation rate can be derived:

$$Ave\left(\frac{\Delta \lambda_s}{T_s}\right) = \frac{\int_0^{\frac{\pi}{3}} \left[\frac{2}{3} V_{dc} \cdot \left(\frac{\lambda_0}{\lambda_s} - \cos\alpha\right)\right] d\theta}{\frac{\pi}{3}} = \frac{2}{\pi} \cdot \left(\frac{\lambda_0}{\lambda_s} \pm \frac{1}{2}\right) \cdot V_{dc} \quad (4)$$

When the control period $T_s$ is short enough, (4) can be simplified to the following expression for the average flux variation rate:

$$Ave\left(\frac{\Delta \lambda_s}{T_s}\right) \approx \frac{1}{\pi} \cdot V_{dc} \quad (5)$$

In an example embodiment, the OVM 64 can be configured to model stator flux variation rate using (5) above, providing a flux variation rate that is proportional to a dc link voltage.

At block 76, a band for a flux controller can be provided. In an example embodiment, the BDM 106 can be configured to determine a flux controller band based on stator flux variation modeling. Referring to (5) above, it can be observed that the stator flux variation rate can be considered constant when the dc bus voltage is constant. On this premise, a limit $B_F$ for a hysteresis flux controller band can be determined from the maximum inverter switching frequency and the dc bus voltage as follows:

$$B_F = \frac{V_{dc}}{4\pi \cdot f_{inv\_max}} \quad (6)$$

In an example embodiment, at block 76 of the method 70, the CBDM 66 can determine a flux controller band using (6). In an exemplary embodiment, determining a band at block 76 can include receiving electric drive characteristics such as the bus voltage and the maximum switching frequency for the inverter 16. By using (6) to provide a control band for a hysteresis flux controller, a control band can be implemented that is appropriate for the particular characteristics of an EDC-controlled system without incurring the expenses associated with a painstaking calibration process. In an example embodiment, a controller band can have an upper limit +$B_F$ and a lower limit -$B_F$ for a total band width of $2B_F$ about a midpoint $B_{CF}$. The resulting controller band is sufficiently wide to be implementable by the inverter, but not so wide that it introduces noise, vibration and harshness into the system as can happen when machine output is permitted to vary widely from a command value.

Figure 11:
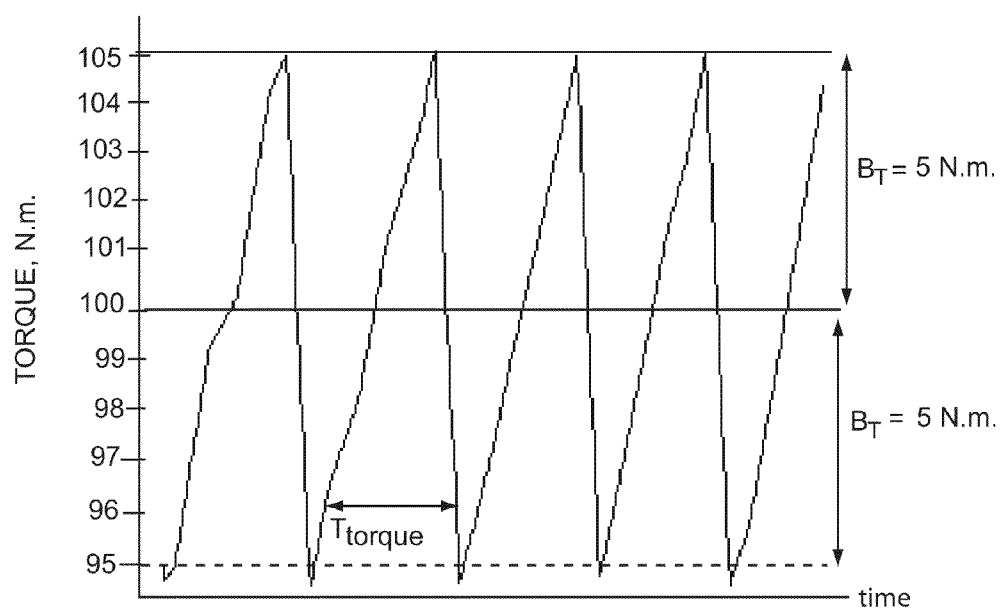
FIG. 11 shows torque output corresponding to a torque controller band having a limit $B_T$=5 N·m.

Referring back to (2), the inverter switching frequency is dependent on the switching rate of a hysteresis torque controller as well as a hysteresis flux controller. As discussed earlier herein, the HCU 60 can be configured to determine a band for a hysteresis torque controller. FIG. 11 shows torque output with a torque controller having a band defined by $B_T$=5 N·m. In an exemplary embodiment, a hysteresis torque controller can have a band based on torque variation rate modeling.

Turning now to band determination for a torque controller, at block 70 torque can be modeled at the MOMM 62. The IPMSM electromagnetic torque can be calculated from the stator current in the rotor flux and stator flux reference frames as shown in (7) and (8) below:

$$\tau_e = \frac{3P}{2}[\lambda_m + (L_d - L_q) \cdot i_d] \cdot i_q \quad (7)$$

$$\tau_e = \frac{3P}{2} \lambda_S \cdot i_Y \quad (8)$$

Combining (7) and (8) results in the following torque expression as a function of torque angle δ:

$$\tau_e = \frac{3P \cdot \lambda_S}{4L_qL_d}[2\lambda_m \cdot L_q \cdot \sin\delta + \lambda_S \cdot (L_d - L_q) \cdot \sin 2\delta] \quad (9)$$

In an exemplary embodiment, the MOMM 62 can be configured to use and execute (9) to model electromagnetic torque. Equation (9) indicates that torque is directly related to the stator flux amplitude and the torque angle δ, the angle between stator flux and rotor flux. Accordingly, IPMSM torque can be controlled by controlling IPMSM stator flux.

At block 72 a torque variation rate can be modeled. By way of example, the OVMM 64 can be configured to model torque variation over a control period by using the (10) below:

$$\frac{\Delta \tau_e}{T_s} = \tau_e \cdot \left(\frac{v_q - k_\lambda v_d}{\lambda_q} - k_\omega \cdot \omega_e - k_R \cdot \frac{R_s}{L_d}\right) \quad (10)$$

Where
$v_q$=q-axis voltage
$v_d$=d-axis voltage
$R_s$=stator resistance
$\omega_e$=rotor angular velocity
$\lambda_q$=q-axis stator flux
$\lambda_d$=d-axis stator flux
$k_\omega = \lambda_d + k_\lambda \cdot \lambda_q$ $$k_R = \frac{L_d}{L_q} \cdot \lambda_q + k_\lambda \cdot (\lambda_m - \lambda_d)$$

$$k_\lambda = \frac{\lambda_q}{\frac{L_q}{L_q - L_q}\lambda_d - \lambda_m}$$

As can be observed from (10), the torque variation rate can be expressed as a function of machine parameters and operating conditions such as stator voltage, stator flux, torque and rotor speed, and may change as the machine parameters and operational states change. A larger torque leads to a faster torque variation rate, and a higher rotor speed leads to a slower torque variation rate. Therefore, the highest torque variation rate can be estimated from the largest torque at zero speed. In an example embodiment, (11) below can be used to model torque variation rate:

$$\frac{\Delta \tau_e}{T_s} = \tau_m \cdot \frac{V_{dc}}{\sqrt{3} \, L_q \cdot I_{sm}} \quad (11)$$

where $\tau_m$ and $I_{sm}$ represent the maximum torque and the maximum stator current, respectively.

At block 76, a band for a hysteresis torque controller can be determined. In a method of the invention, a band for a hysteresis torque controller can be based on a torque variation rate and predetermined machine and operational parameters. In an example embodiment, a controller band can be determined based on a maximum torque variation rate, using the maximum machine torque at zero machine speed. By way of example, determining a band for a hysteresis torque controller can comprise implementing (12) below:

$$B_T = \frac{V_{dc}}{\sqrt{3} \, L_q I_{sm} f_{inv\_max}} \cdot \tau_m \quad (12)$$

In an example embodiment, (12) can be used to determine an initial hysteresis torque controller band having a bandwidth $2B_T$ that ranges from $-B_T$ to $+B_T$ about a midpoint $B_{CT}$.

While example equations for modeling torque and stator flux, modeling their variation rates, and providing controller bands based on the variation rates, are provided herein, it is understood that various band determination schemes employing alternate modeling equations and other machine and/or EDS characteristics can also be implemented using the modeling methods of the invention.

Figure 12:
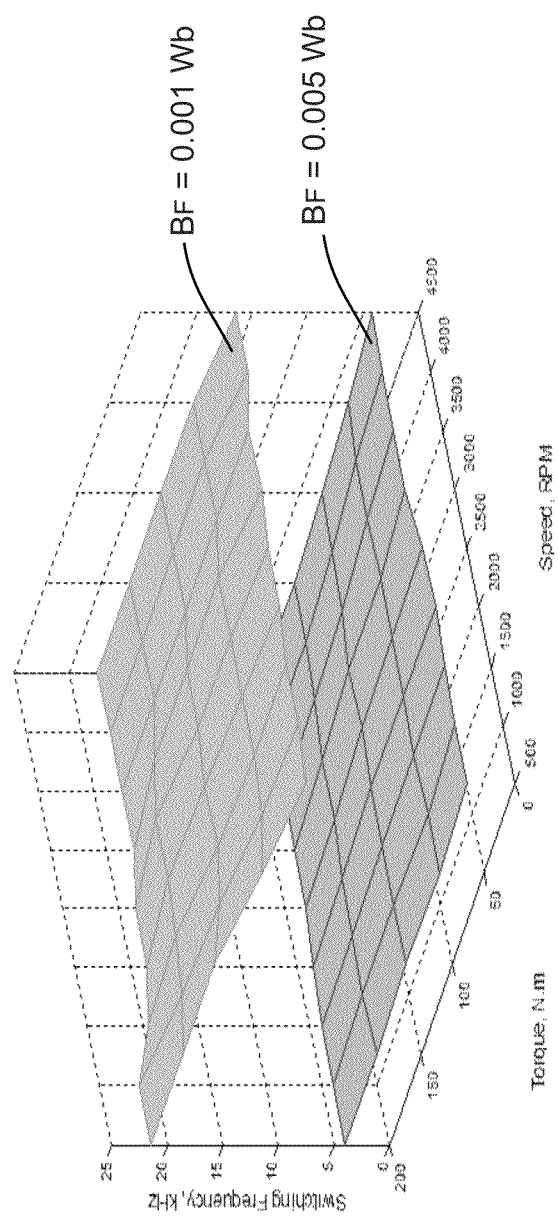
FIG. 12 shows simulation results using flux variation rate modeling of invention.
Figure 13:
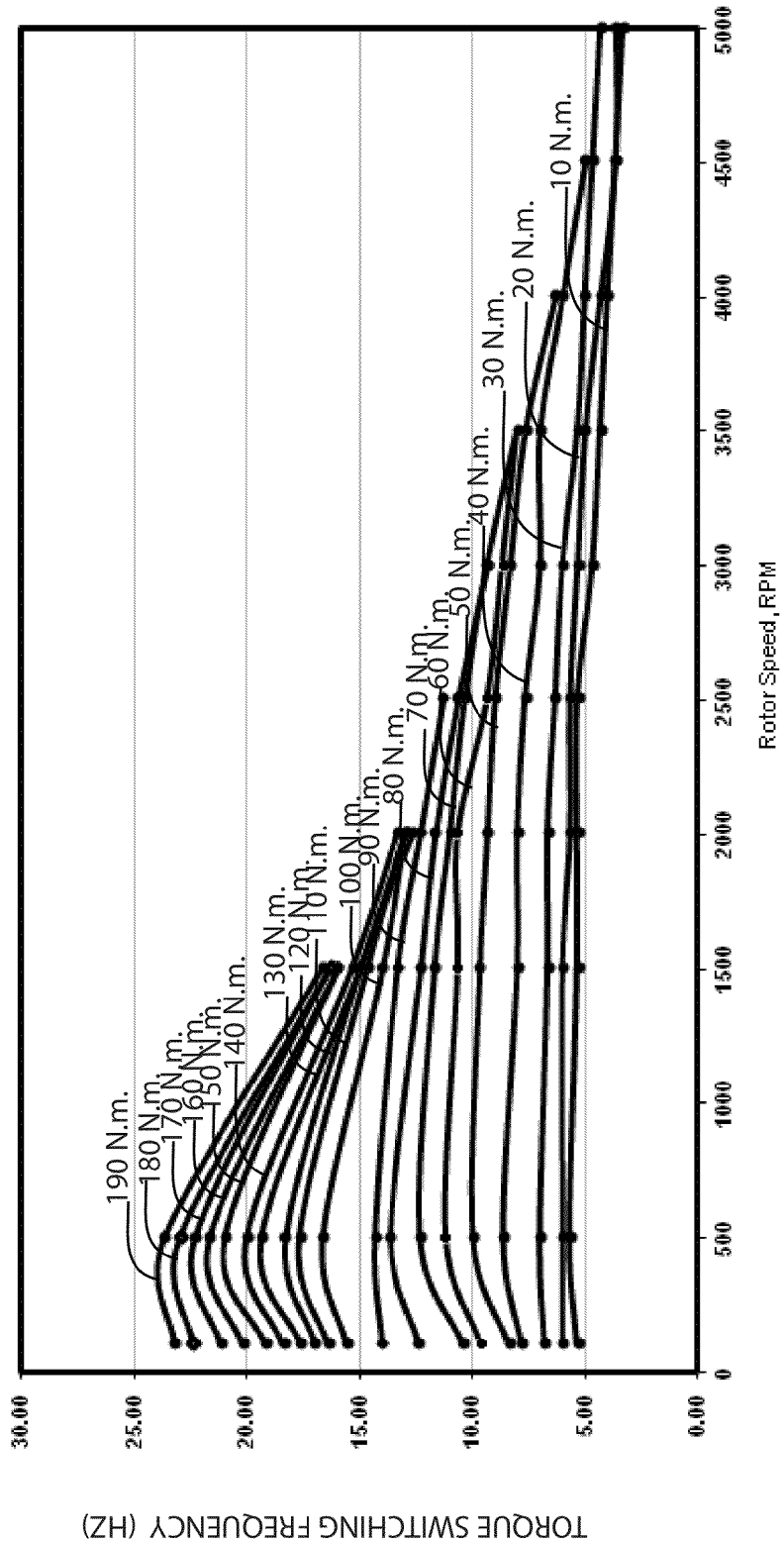
FIG. 13 shows simulation results using torque variation rate modeling of the invention.

FIGS. 12 and 13 show simulation results using the models of the invention. FIG. 12 shows the switching frequency of a stator flux controller at a constant band defined by an upper limit $B_F=0.001$ Wb, and BF=0.005 Wb. For each of the two band selections, speed is swept from 0 rpm to 4500 rpm and torque is swept from 0 N·m. to 200 N·m. As can be observed from the results shown in FIG. 12, the switching frequency for a hysteresis flux controller can remain fairly constant under various operational conditions.

FIG. 13 shows the switching frequency of a hysteresis torque controller with a constant control band having a limit $B_T=5$ N·m for speed sweeps performed at torque levels from 0 N·m. to 190 N·m. FIG. 13 confirms that the maximum switching frequency (23 kHz) occurs at the highest torque (190 N·m) and a very low speed. Unlike the flux controller switching frequency, the switching frequency of a torque controller can vary with varying operation conditions.

Systems, apparatus, and methods for determining a band for a hysteresis controller are presented herein. Analytical modeling can be used to replace former trial and error methods for calibrating a hysteresis controller for a particular application. Modeling machine output such as electromagnetic torque and stator flux, and modeling machine output variation rates can be used to efficiently provide hysteresis control bands that can consistently control torque and flux in a manner that results in good electric drive performance at lower costs.

Various embodiments have been disclosed herein for illustrative purposes. Those skilled in the art will appreciate that various modification, additions and subtractions are possible without departing from the spirit of the invention as described in the appended claims.

What is claimed is:

1. A method for determining a control band for a hysteresis controller, comprising:
   modeling an interior permanent magnet synchronous machine (IPMSM) output;
   modeling a variation rate for said machine output; and
   using said variation rate to provide said control band for said hysteresis controller.

2. The method of claim 1, wherein said machine output comprises electromagnetic torque.

3. The method of claim 1, wherein said machine output comprises stator flux.

4. The method of claim 1, wherein said modeling a variation rate for said machine output comprises modeling a stator flux variation rate, and wherein said IPMSM is configured for direct torque control (DTC).

5. The method of claim 1, wherein said modeling said variation rate comprises modeling an average variation rate for said machine output.

6. The method of claim 1, wherein said modeling a variation rate comprises modeling a stator flux variation rate as $$\frac{\Delta \lambda_s}{T_s} = \frac{2}{3} V_{dc} \cdot \left(\frac{\lambda_0}{\lambda_s} - \cos\alpha\right) \text{ where } \frac{\Delta \lambda_s}{T_s}$$

represents stator flux variation rate, $V_{dc}$ a bus voltage for an inverter configured to provide current to said machine, $T_s$ represents a control period, $$\lambda_0 = \frac{1}{3} V_{dc} \cdot T_s,$$

$\Delta\lambda_s$ represents stator flux variation, $\theta$ represents a position for a stator flux vector, and $\alpha$ represents an angle between said stator flux vector and an applied voltage vector.

7. The method of claim 6, wherein $\alpha$ has a value belonging to the set of $$\frac{\pi}{2} + \theta, \frac{\pi}{6} + \theta, \frac{\pi}{2} - \theta, \text{ and } \frac{5\pi}{6} - \theta.$$

8. The method of claim 1, wherein said providing a controller band comprises providing a band limit $$B_F = \frac{V_{dc}}{4\pi \cdot f_{inv\_max}}$$

for a hysteresis flux controller, where $V_{dc}$ represents a bus voltage for an inverter configured to provide current to said machine, and $f_{inv\_max}$ represents a maximum switching frequency for an inverter configured to provide current to said machine.

9. The method of claim 1, wherein said modeling a variation rate for said electrical machine output comprises modeling a torque variation rate as $$\frac{\Delta \tau_e}{T_s} = \tau_e \cdot \left( \frac{v_q - k_\lambda v_d}{\lambda_q} - k_\omega \cdot \omega_e - k_R \cdot \frac{R_s}{L_d} \right),$$

where $v_q$ represents q-axis voltage, $v_d$ represents d-axis voltage, $R_s$ represents stator resistance, $\omega_e$ represents rotor angular velocity, $k_\lambda$ represents $$\frac{\lambda_q}{\frac{L_q}{L_q - L_q} \lambda_d - \lambda_m},$$

$k_R$ represents $$\frac{L_d}{L_q} \cdot \lambda_q + k_\lambda \cdot (\lambda_m - \lambda_d),$$

$k_\omega$ represents $\lambda_d + k_\lambda - \lambda_q$, $\lambda_q$ represents q-axis stator flux, and $\lambda_d$ represents d-axis stator flux.

10. The method of claim 1, wherein said providing said band comprises providing a band limit $$B_T = \frac{V_{dc}}{\sqrt{3} L_q I_{sm} f_{inv\_max}} \cdot \tau_m$$

for a hysteresis torque controller, where $V_{dc}$ represents a bus voltage for an inverter configured to provide current to said machine, and $f_{inv\_max}$ represents a maximum switching frequency for an inverter configured to provide current to said machine, Lq represents q-axis inductance of said machine, $\tau_m$ represents the maximum torque of said machine and $I_{sm}$ represents the maximum stator current of said machine.

11. A system comprising,
an electrical machine;
a hysteresis controller configured to control an output of said electrical machine;
a voltage vector unit configured to provide a voltage vector to an inverter configured to provide current to said machine, said voltage vector dependent on said hysteresis controller output; and
wherein said hysteresis controller has a control band based on a model of said machine output or a model of said machine output variation rate.

12. The system of claim 11, wherein said hysteresis controller comprises a stator flux controller having a band limit $$B_F = \frac{V_{dc}}{4\pi \cdot f_{inv\_max}}$$

where $V_{dc}$ represents a bus voltage for an inverter configured to provide current to said machine, and $f_{inv\_max}$ represents a maximum switching frequency for said inverter.

13. The system of claim 11, wherein said hysteresis controller comprises a torque controller having a band limit of $$B_T = \frac{V_{dc}}{\sqrt{3} L_q I_{sm} f_{inv\_max}} \cdot \tau_m,$$

where $V_{dc}$ represents a bus voltage for an inverter configured to provide current to said machine, $f_{inv\_max}$ represents a maximum switching frequency for said inverter, $L_q$ is a q-axis inductance for said machine, $I_{sm}$ is a maximum stator current for said machine, $\tau_m$ is a maximum torque for said machine.

14. A method for providing a stator flux controller band, comprising:
providing a limit $B_F$ for said controller band by dividing an inverter DC bus voltage $V_{DC}$ by the product ($4\pi^* f_{inv\_max}$), where $f_{inv\_max}$ is a maximum switching frequency of an inverter.

15. The method of claim 14, wherein said controller band has a width of $2B_F$.

16. The method of claim 15, wherein said band is defined by an upper limit of $+B_F$ and a lower limit of $-B_F$ about a midpoint $B_{CF}$.

17. A method for defining a torque controller band, comprising:
providing a limit $B_T$ for said controller band by dividing an inverter DC bus voltage by the product ( $\sqrt{3} L_q I_{sm} f_{inv\_max}$), where $L_q$ is a q-axis inductance for said machine, $I_{sm}$ is a maximum stator current for said machine, $\tau_m$ is a maximum torque for said machine, and $f_{inv\_max}$ is a maximum switching frequency of an inverter.

18. The method of claim 17, wherein said controller band has a width of $2B_T$.

19. The method of claim 18, wherein said band is defined by an upper limit of $+B_T$ and a lower limit of $-B_T$ about a midpoint $B_{CT}$.

20. A hysteresis controller band unit (HCBU), comprising:
a machine output modeling module (MOMM) configured to model an interior permanent magnet synchronous machine output;
a machine output variation modeling module (OVMM) configured to model said machine output variation rate; and
a controller band module (CBM) configured to provide a control band for a hysteresis controller based on said output modeling or said out variation rate modeling.

21. The HCBU of claim 20, wherein said MOMM is configured to model machine torque.

22. The HCBU of claim 20, wherein said MOMM is configured to model stator flux.

23. The HCBU of claim 20, wherein said CBM is configured to provide said control band based on said machine output variation rate.

24. The HCBU of claim 20, wherein said CBM is configured to provide a limit B for said control band, with $$B = \frac{V_{dc}}{4\pi \cdot f_{inv\_max}},$$

where $V_{dc}$ represents a bus voltage for an inverter configured to provide current to said machine, and $f_{inv\_max}$ represents a maximum switching frequency for said inverter.

25. The HCBU of claim 20, wherein said CBM is configured to provide a limit B for said control band, with $$B = \frac{V_{dc}}{\sqrt{3}\, L_q I_{sm} f_{inv\_max}} \cdot \tau_m,$$

where $V_{dc}$ represents a bus voltage for an inverter configured to provide current to said machine, and $f_{inv\_max}$ represents a maximum switching frequency for an inverter configured to provide current to said machine, Lq represents q-axis inductance of said machine, $\tau_m$ represents the maximum torque of said machine and $I_{sm}$ represents the maximum stator current of said machine.

26. A system for determining a control band, comprising:
   a processor; and
   a hysteresis control band unit (HCBU) configured to cooperate with said processor to provide said control band for a hysteresis controller using an analytical expression configured to model an output of permanent magnet synchronous machine.

27. The system of claim 26, wherein said HCBU comprises a non-transitory medium in which logic instructions executable by said processor are stored, said instructions configured to cause the processor to provide a controller band for a hysteresis controller.

28. The system of claim 27, wherein said instructions cause the modeling of a variation rate for said output, and cause a determination of said controller band based on said machine output variation rate.

* * * * *